(12) United States Patent
Haas et al.

(10) Patent No.: US 6,465,987 B1
(45) Date of Patent: Oct. 15, 2002

(54) POWER SOURCE OF PERIPHERAL DEVICES

(75) Inventors: William Robert Haas, Fort Collins; Kirk Steven Tecu, Greeley, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/690,533

(22) Filed: Oct. 17, 2000

(51) Int. Cl.[7] .................................................. H02J 7/00
(52) U.S. Cl. ...................................................... 320/128
(58) Field of Search .......................................... 320/128

(56) References Cited

U.S. PATENT DOCUMENTS

| | | | | |
|---|---|---|---|---|
| 5,280,283 A | * | 1/1994 | Raasch et al. | 700/84 |
| 5,517,434 A | * | 5/1996 | Hanson et al. | 364/708.1 |
| 5,590,022 A | * | 12/1996 | Harvey | 361/683 |
| 5,638,540 A | * | 6/1997 | Aldous | 713/300 |
| 5,650,669 A | * | 7/1997 | Aldous | 307/66 |
| 5,914,481 A | * | 6/1999 | Danielson et al. | 235/472 |
| 5,946,495 A | * | 8/1999 | Scholhamer et al. | 395/750.01 |
| 6,040,572 A | * | 3/2000 | Khovaylo et al. | 250/235 |
| 6,149,319 A | * | 11/2000 | Richter et al. | 395/750.01 |
| 6,163,387 A | * | 12/2000 | Han | 358/487 |
| 6,172,884 B1 | * | 1/2001 | Lanni | 363/21 |
| 6,178,514 B1 | * | 1/2001 | Wood | 713/300 |

* cited by examiner

Primary Examiner—Edward H. Tso
Assistant Examiner—Pia Tibbits

(57) ABSTRACT

A peripheral device for a computer is powered by an internal rechargeable battery. A data line electrically connects the peripheral device to the computer. The data line has conductors that provide for data transmission between the computer and the peripheral device. The data line also has conductors that provide for power transmission from the computer to the peripheral device. The peripheral device uses the power transmission conductors to recharge the battery, thereby eliminating the need for a separate power line to be associated with the peripheral device.

16 Claims, 2 Drawing Sheets

POWER SOURCE OF PERIPHERAL DEVICES

TECHNICAL FIELD OF THE INVENTION

The present invention relates to powering a peripheral device from power supplied by a computer and, more particularly, to recharging batteries located within the peripheral device from power supplied by a data connection between the peripheral device and the computer.

BACKGROUND OF THE INVENTION

Computer systems generally have a processor, such as a desktop or laptop computer, with a plurality of peripheral devices electrically connected to the processor. For example, a monitor, a printer, speakers, a scanner, and other devices may be electrically connected to the processor. Many of these peripheral devices are powered from conventional electrical wall outlets. Wall outlets are typically arranged in pairs at different locations within a room. Thus, in order to supply electric power to the computer system, power cords must extend between several wall outlets located throughout a room and the computer system. Alternatively, an adapter having outlets may be mounted in a wall outlet and the multiple different power cords of the computer system may be connected to it. In either case, numerous power cords must be employed, creating a chaotic array of wires in the vicinity the computer system.

The voltages and frequencies of power supplied by wall outlets differ between countries. In addition plug configurations for wall outlets differ between countries. For example, the voltage, frequency and plug configuration of wall outlets in a first country may all differ from the voltage, frequency and plug configuration of wall outlets in a second country. These differences cause peripheral device manufacturers to supply different power cords for use in different countries, which substantially increases production costs. Furthermore, power supplies which are internal to the peripheral device must be changed to accommodate the different voltages and frequencies or designed, at additional expense, so that a single power supply can accommodate the different voltages and frequencies.

A need exists for a peripheral device that overcomes some or all of these problems.

SUMMARY OF THE INVENTION

The present invention is directed toward a peripheral device that is powered by a data cable electrically connecting the peripheral device to a processor, such as a desktop or laptop computer. The data cable supplies electric power to the peripheral device in addition to providing data communications between the peripheral device and the processor. The peripheral device may additionally be powered by internal, rechargeable batteries which may be recharged by the power supplied by the data cable. Both the batteries and the data cable may serve to supply power to operate the peripheral device. In the alternative, the batteries alone may supply power to operate the peripheral device or the power supplied by the data cable alone may be used to operate the device. The charged batteries may be adapted to supply more electric power than supplied by the data cable. This additional power enables the operation of a relatively high power consuming peripheral device by using a relatively low power supplying data cable.

The use of a power supplying data cable and rechargeable batteries alleviates the need for the peripheral device to be electrically connected to a wall outlet. Therefore, only the above-described data cable needs to extend from the peripheral device, eliminating many electrical cords in a computer system having multiple peripheral devices. The rechargeable batteries also permit an otherwise non-portable peripheral device to become somewhat portable. For example, a peripheral device may be electrically connected to a laptop computer, wherein both are operated by their respective batteries and not by power supplied by a conventional wall outlet. Furthermore, the charged batteries of a peripheral device may enable the peripheral device to be entirely disconnected from the charging data cable for short term operations in a stand-alone mode. In addition to the above described battery charging by way of the data cable, the battery may be charged by an optional external connection to a wall outlet.

DETAILED DESCRIPTION OF THE INVENTION

Figures 1, 2:
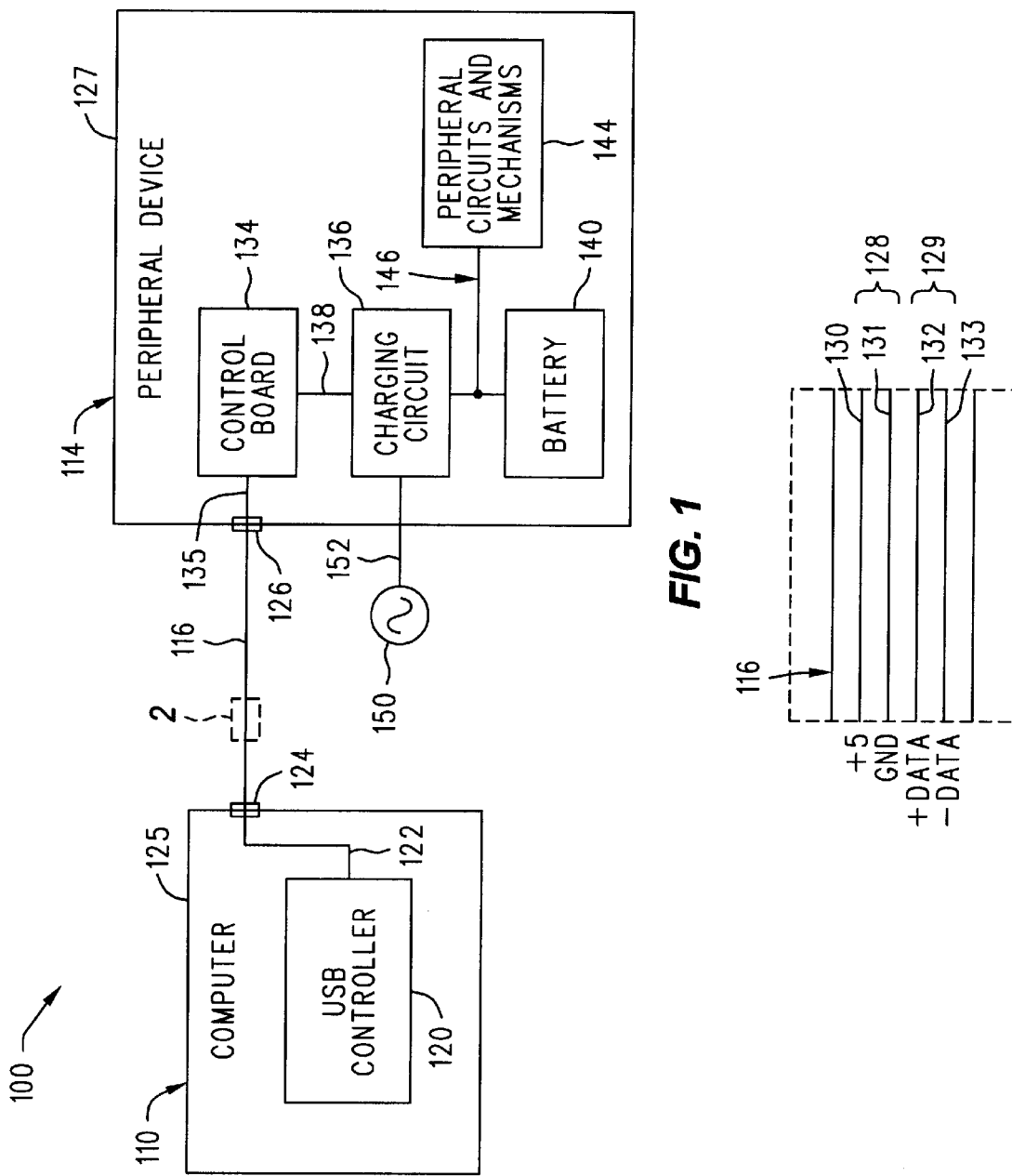
FIG. 1 is a schematic illustration of a computer system having a peripheral device powered by a computer.
FIG. 2 is a schematic illustration of the conductors within the cable of FIG. 1 connecting the peripheral device to the computer.
Figure 3:
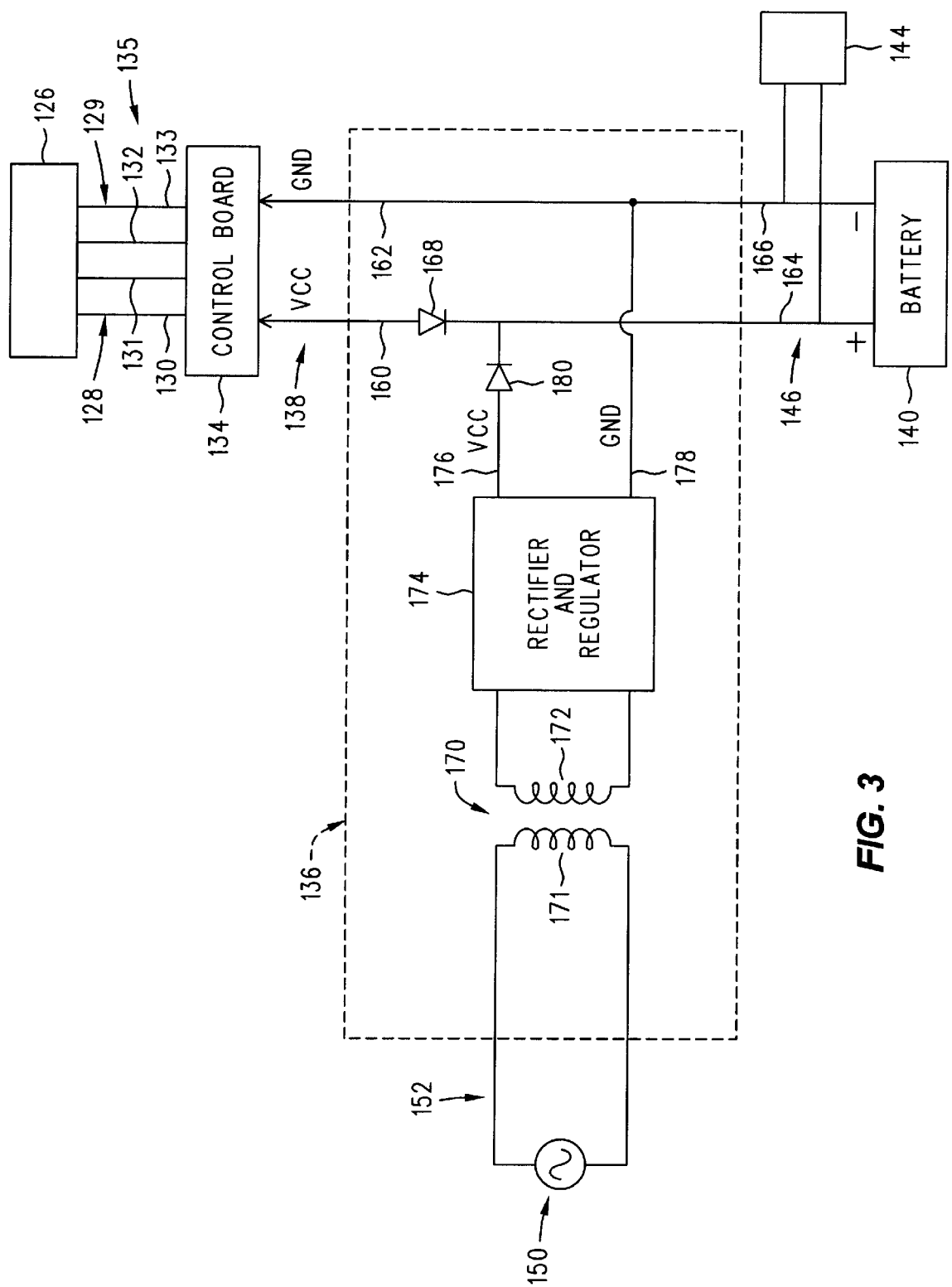
FIG. 3 is a schematic illustration of the charging circuit of the peripheral device of FIG. 1.

FIGS. 1 through 3, in general, illustrate a computer system 100 comprising a computer 110 comprising a computer electrical connector 124 that is adapted to output electric power. The computer system 100 further comprises a peripheral device 114 having a rechargeable power supply 140 (sometimes referred to as a battery) and a peripheral device electrical connector 126. The peripheral device electrical connector 126 is electrically connected to the rechargeable power supply 140. A cable 116 electrically connects the computer electrical connector 124 and the peripheral device electrical connector 126.

FIGS. 1 through 3 also, in general, illustrate a method of operating a peripheral device, the method comprises charging a rechargeable power supply 140 using electric current from a computer 110 and operating the peripheral device 114 with power supplied by the rechargeable power supply 140.

FIGS. 1 through 3 also, in general, illustrate a computer peripheral device 114 comprising a single electrical connector 126 having a first portion 128 and a second portion 129. The first portion 128 is adapted to conduct electric current and the second portion 129 is adapted to conduct data signals. A rechargeable battery 140 is operatively associated with the electrical connector first portion 128.

Having generally described the computer system 100, it will now be described in greater detail.

Referring to FIG. 1, which is a schematic illustration of the computer system 100, the computer system 100 may have a computer 110 and a peripheral device 114 electrically connected to each other by a cable 116. As will be described in greater detail below, the cable 116 may, as a non-limiting example, be a conventional universal serial bus (USB) cable.

The computer 110 may be a conventional personal computer. For example the computer 110 may be of the type commercially available from the Hewlett-Packard Company of Palo Alto, Calif. and sold under the product name, Pavilion. The peripheral device 114 is described herein, in a non-limiting example, as being a flatbed scanner. Except for the inventive concepts described herein, the peripheral device 114 may function in a similar manner as any of a family of scanners commercially available from the Hewlett-Packard Company of Palo, Calif. and sold under the product name, ScanJet.

The computer 110 may have a universal serial bus controller 120 located therein in addition to other conventional computer components. The universal serial bus controller 120 is sometimes referred to herein simply as the USB controller 120. A data line 122 may connect the USB controller 120 to a USB connector 124 attached to the housing 125 of the computer 110. A cable 116 serves to connect the USB connector 124 located on the computer 110 to a USB connector 126 located on the housing 127 of a peripheral device 114. Accordingly, the universal serial bus extends between the USB controller 120 and the peripheral device 114.

Referring briefly to FIG. 2, which is a cut away view of the cable 116, a universal serial bus typically has two pairs of conductors, which are a pair of voltage conductors 128 and a pair of data conductors 129. The voltage conductors 128 are individually referenced as a positive voltage line 130 and its corresponding ground line 131. The data conductors 129 are individually referenced as a positive data line 132 and a corresponding negative data line 133. The voltage conductors 128 may, as a non-limiting example, supply five volts at a maximum power of two watts. Accordingly, the USB controller 120 in the computer 110 may supply five volts at a maximum power of two watts to the peripheral device 114. It should be noted that the description of the conductors with reference to the cable 116 is applicable to other portions of the computer system 100 that use a USB bus. It should also be noted that other variations of a USB bus and cable may be used herein.

Referring again to FIG. 1, having described the computer 110 and the cable 116, the peripheral device 114 will now be described.

As described above, the peripheral device 114 may have the USB connector 126 attached to the housing 127. In addition, the peripheral device 114 may have a control board 134 electrically connected to the USB connector 126 by way of a data line 135. The conductors in the data line 135 may be substantially similar to the conductors in the cable 116, FIG. 2. The control board 134 processes data for transmission between the peripheral device 114 and the computer 110 in a conventional manner. The control board 134 may also separate the above-described voltage conductors 128, FIG. 2, from the data conductors 129 and connect them to a charging circuit 136 by way of a power line 138. Alternatively, the voltage conductors 128 may be tapped and connected to the charging circuit 136 by way of the power line 138.

As described in greater detail below, the charging circuit 136 may be electrically connected to a rechargeable battery 140 and peripheral circuits and mechanisms 144 by way of power lines 146. The charging circuit 136 may also be connected to an optional external power source 150 by way of a power cord 152. A simplified schematic illustration of the charging circuit 136 is shown in FIG. 3. The power line 138 may have two conductors, a VCC line 160 and a corresponding ground line 162. These lines may pass through the charging circuit 136 to become a power line 164 and a ground line 166, which are electrically connected to the power lines 146. A diode 168 may be located in the VCC line 160 to prevent current from flowing from the battery 140 to the control board 134 when the control board 134 is inactive.

The charging circuit 136 may provide for power from an optional external power source 150, such as a wall outlet, to operate the peripheral device. As such, the charging circuit 136 may have a transformer 170 that converts a standard AC wall outlet voltage to one that may be used by the charging circuit 136. The primary side 171 of the transformer 170 may be electrically connected to the external power cord 152, which may be a conventional removable power cord that connects to a wall outlet. The external power cord 152 may, as an example, be a conventional two conductor power cord. A conventional ground, not shown, may additionally be located within the power cord 152 and may serve to ground chassis components in a conventional manner. The secondary side 172 of the transformer 170 may be electrically connected to a rectifier and regulator 174. The rectifier and regulator 174 serves to rectify and regulate the output of the transformer 170. The rectifier and regulator 174 may have a VCC line 176 and a ground line 178. The VCC line 176 may be electrically connected to the VCC line 160 of the control board 134 through a diode 180. The ground line 178 may be electrically connected to the ground line 162 of the control board 134. The diode 180 serves to prevent current from the battery 140 or the control board 134 from leaking through the rectifier and regulator 174 when it is inactive.

Referring again to FIG. 1, the peripheral circuits and mechanisms 144 may include electromechanical mechanisms and processing devices that control the operation of the peripheral device 114. In the example where the peripheral device 114 is a scanner, the peripheral circuits and mechanisms 144 may include a lamp that illuminates an object, motors that move a scan carriage relative to the object, and processors that process and store image data representative of an image of the object. In the example where the peripheral device 114 is a printer, the peripheral circuits and mechanisms 144 may include motors to move paper and printing mechanisms that print ink onto the paper.

The battery 140 may be a single rechargeable battery or a plurality of rechargeable batteries capable of supplying enough electric power to operate the peripheral circuits and mechanisms 144. Accordingly, the battery 140 may supply enough electric power to operate all the functions of the peripheral device 114. When the peripheral circuits and mechanisms 144 are inactive, the charging circuit 136 charges the battery 140 so that it may supply the above-described power required by the peripheral device 114. It should be noted that some peripheral devices may function in a reduced performance mode where minimal power is required for their operation. These peripheral devices may operate solely by the power supplied by the cable 116 without using power supplied by the battery 140. Such devices remain functional even upon the failure or other loss of power from the battery 140.

Having described the components comprising the computer system 100, the operation of the computer system 100 will now be described. The peripheral device 114 will be described below as operating without the external power source 150 followed by a brief description of the operation of the peripheral device 114 with the external power source 150 connected thereto.

In summary, the computer 110 provides electric power to the peripheral device 114. Accordingly, the peripheral device 114 is able to function without being required to be connected to an external power source, such as the external power source 150. The supply of power from the computer 110 allows for only one cable, the cable 116, to be connected to the peripheral device 114. Thus, no power cords are required to be connected to the peripheral device 114.

When the peripheral device 114 is connected to the computer 110 as shown in FIG. 1, the USB controller 120 provides electric power to the control board 134 by way of the cable 116. The electric power in the non-limiting example described herein is provided through the above-described voltage conductors 128, FIG. 2, of the universal serial bus. It should be noted that the USB controller 120 is typically only adapted to supply approximately two watts of power to the control board 134. The control board 134 separates the voltage conductors 128 from the data conductors 129 of the universal serial bus to drive the charging circuit 136 by way of the power line 138. The peripheral circuits and mechanisms 144 may draw much more than two watts during their operation, thus, the power supplied by the universal serial bus alone is typically not adequate to operate most peripheral devices 114 at optimal performance levels. As described below, the battery 140 supplies additional power to operate the peripheral circuits and mechanisms 144 and, thus, the peripheral device 114.

The power line 138 uses the power supplied by the control board 134 to charge the battery 140. Referring again to FIG. 3, the VCC line 160 and the ground line 162 of the power line 138 pass through the charging circuit 136 to supply the power lines 146 and to charge the battery 140. The diode 168 prevents current from flowing from the power lines 146 into the control board, which would drain the battery 140. The battery 140, when charged, is, in one embodiment, capable of supplying enough power to operate the peripheral circuits and mechanisms 144 and, thus, the peripheral device 114, FIG. 1, by itself. It should be noted that additional power may be supplied to the peripheral circuits and mechanisms 144 by the charging circuit 136. During periods when the peripheral device 114 is idle, the battery 140 may draw current from the charging circuit 136 so that it is sufficiently charged to operate the peripheral device 114. Also, with some low power consumption peripherals, the charging circuit 136 may provide sufficient power to operate the peripheral device, at least in a reduced performance mode, without current from the battery 140.

As described above, the charging circuit 136 may be electrically connected to the optional external power source 150. The external power source 150 may be supplied from a conventional wall outlet in the form of an alternating current. The power is conducted to the primary side 171 of the transformer 170 by way of the power cord 152. The transformer 170 converts the power from the external power source 150 to a voltage suitable for use in the charging circuit 136 which is output from the secondary side 172 of the transformer 170. The rectifier and regulator 174 rectifies and regulates the output of the transformer 170. The output of the rectifier and regulator 174 is electrically connected to the power line 138 by way of a diode 180. More specifically, the VCC line 176 may be electrically connected to the power line 164 by way of the diode 180. The voltage output from the rectifier and regulator 174 on the VCC line 176 may be the same as the VCC output of the control board 134. Both outputs are equally reduced by the forward voltages of the diode 168 and the diode 180. Thus, both outputs provide the same voltage to the power line 164 relative to the ground line 166.

Referring again to FIG. 1, the peripheral device 114 has been described herein as operating by the use of a single voltage supply electrically connected to the battery 140. It should be noted that another embodiment of the peripheral device 114 only operates high power consuming devices from current supplied by the battery 140. Other low power components are operated using power supplied directly from the computer 110. For example, an electronic switch, not shown, may disconnect the control board 134 from the charging circuit 136 during operation of the peripheral device 114. The low power consuming components, such as processors and memory may then be operated using current supplied by the computer 110. Higher power consuming devices, such as lamps and motors, may be operated using current supplied by the battery 140. This embodiment assures that the USB controller 120 within the computer 110 is not overloaded during operation of the peripheral device 114.

The peripheral device 114 described herein has several advantages over its conventional counterpart. For example, only one cable is required to be connected to the peripheral device 114. This single cable alleviates the need to operate the peripheral device 114 in the proximity of a wall outlet and it reduces the number of power cords associated with the computer system 100. The peripheral device 114 may also be relatively portable. For example, either the power line 138 or the external power source 150 may charge the battery 140. The power line 138 or the external power source 150 may then be disconnected and the peripheral device 114 may be used at a remote location where no external power is available. In this situation, the peripheral device 114 supplies its own power, therefore, the computer 110 may be a battery-powered computer, such as a laptop computer because it is not required to power the peripheral device 114. Alternatively, the peripheral device 114 may be operated in a stand-alone mode completely disconnected from the computer 110.

The peripheral device 114 has been described herein in one embodiment as being a scanner. The scanner may, as an example, be of the type that uses a charge-coupled device to generate image data representative of an object. The charge-couple device type scanner requires a more intense light source than its counterpart, a contact image sensor type scanner. For example, the contact image sensor type scanner may use a light source consisting of low power light-emitting diodes. The charge-coupled device type scanner, on the other hand, typically requires a much higher power lamp to illuminate an object. The charge-coupled device type scanner generally is able to generate more image data representative of an image of an object and, thus, is generally able to generate a higher quality image. The peripheral device 114 described herein may continuously recharge its battery 140 and, thus, may support the light source required for a charge-coupled device.

Although in one embodiment of the invention, the peripheral device 114 is a scanner, the peripheral device 114 may, in other embodiments, be other devices. For example, the peripheral device 114 may be a printer, speakers, a modem, a data storage device, such as a magnetic or an optical drive, a video device, or virtually any other peripheral device.

The power transfer has been described herein as being associated with a universal serial bus (USB). It is to be understood that this is for illustration purposes only and that other sources of power within the computer 110 may supply power to the peripheral device 114. For example, the data bus defined by IEEE 1394 and commonly referred to as "fire wire" may also be used herein.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A computer system comprising:
   a computer comprising a computer electrical connector, said computer electrical connector being adapted to output electric power and transfer data between said computer and a scanner;
   a scanner comprising a rechargeable power supply, a light source, and a scanner first electrical connector, said scanner first electrical connector operatively connected to said rechargeable power supply and said light source; and
   a cable electrically connecting said computer electrical connector and said scanner first electrical connector.

2. The computer system of claim 1, wherein said power supply is a battery.

3. The computer system of claim 1, wherein said computer electrical connector is electrically connected to a universal serial bus.

4. The computer system of claim 1, wherein said computer further comprises a universal serial bus controller, said universal serial bus controller being electrically connected to said computer electrical connector.

5. The computer system of claim 1, wherein said scanner further comprises a scanner second electrical connector, said scanner second electrical connector being electrically connected to said rechargeable power supply and adapted to be electrically connected to an external power supply.

6. The computer system of claim 1, wherein said computer further comprises a data controller configured to the international electrical and electronic engineers standard 1394, said computer electrical connector being electrically connected to said data controller.

7. A method of operating a scanner, said scanner comprising a light source, said method comprising:
   charging a rechargeable power supply using electric current from a computer operatively connectable to said scanner; and
   operating said scanner, including said light source, with power supplied by said rechargeable power supply.

8. The method of claim 7, wherein said using electric current from said computer comprises using electric current supplied by way of a universal serial bus.

9. The method of claim 7, wherein said charging comprises charging a rechargeable battery located within said scanner.

10. The method of claim 7 and further comprising charging said rechargeable power supply from a power source external to said scanner.

11. The method of claim 7, wherein said operating said scanner, including said light source, comprises operating said scanner, including said light source, using power supplied solely from said rechargeable power supply.

12. The method of claim 7, wherein said operating said scanner, including said light source, comprises operating said scanner, including said light source, using power supplied both from said rechargeable power supply and from said computer.

13. A scanner comprising:
   a single electrical connector having a first portion and a second portion, said first portion being adapted to conduct electric current, said second portion being adapted to conduct data signals;
   a rechargeable battery operatively connected to said electrical connector first portion; and
   a light source operatively connected to said rechargeable battery.

14. The scanner of claim 13 wherein said single connector is a universal serial bus connector.

15. The scanner of claim 13, wherein said rechargeable battery is electrically connected to said connector first portion.

16. A scanner comprising:
   electric current supply means for supplying electric current to a light source within said scanner, said electric current supplying means being rechargeable; and
   connecting means for connecting said electric current supplying means to a cable supplying electric current and data signals.

* * * * *